US010623524B2

United States Patent
Cardillo

(10) Patent No.: US 10,623,524 B2
(45) Date of Patent: Apr. 14, 2020

(54) TEMPORAL NETWORK SERVICE REQUEST COMBINATION TO IMPROVE THROUGHPUT

(71) Applicant: International Business Machines Corporation, Armonk, NY (US)

(72) Inventor: Bryan D. Cardillo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 14/878,103

(22) Filed: Oct. 8, 2015

(65) Prior Publication Data

US 2017/0104843 A1 Apr. 13, 2017

(51) Int. Cl.
*G06F 17/28* (2006.01)
*H04L 29/08* (2006.01)
*H04L 29/06* (2006.01)

(52) U.S. Cl.
CPC ............ *H04L 67/325* (2013.01); *H04L 69/28* (2013.01)

(58) Field of Classification Search
USPC ......................... 709/201–203, 223, 227–229
See application file for complete search history.

(56) References Cited

U.S. PATENT DOCUMENTS

| 8,516,146 | B1 * | 8/2013 | Yen ........................ | H04L 67/16 709/201 |
| 8,843,563 | B1 * | 9/2014 | Hartman ............. | H04M 3/5183 709/206 |
| 2002/0165920 | A1 | 11/2002 | Keller-Tuberg | |
| 2008/0279189 | A1 * | 11/2008 | Smith ................... | H04L 47/564 370/394 |
| 2014/0112405 | A1 * | 4/2014 | Jafarian ............... | H04B 7/0413 375/267 |

OTHER PUBLICATIONS

R. High, The Era of Cognitive Systems: An Inside Look at IBM Watson and How it Works, IBM Redbooks, 2012.
Yuan et al., Watson and Healthcare, IBM developerWorks, 2011.

(Continued)

*Primary Examiner* — Younes Naji
*Assistant Examiner* — Da T Ton
(74) *Attorney, Agent, or Firm* — Terrile, Cannatti & Chambers, LLP; Michael Rocco Cannatti

(57) ABSTRACT

An approach is provided for generating a delayed network service response for a plurality of network service requests using a natural language processing analysis to identify a plurality of parameters associated with a received first network service request and start, upon receipt of the first network service request, a configurable delay timer having a duration that is controlled by the plurality of parameters so that equivalent network service requests from users that are received before expiration of the configurable delay timer may be identified and serviced by generating a network service response in response to the first network service request without generating a network service response to the one or more equivalent network service requests such that the network service response is sent to the first user and to the one or more users after expiration of the configurable delay timer.

21 Claims, 3 Drawing Sheets

(56) References Cited

OTHER PUBLICATIONS

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.
Wei et al., Video Personalization in Resource-Constrained Multimedia Environments, Proceedings of the 15th International Conference on Multimedia, 902-911 (2007).
S. Deering, Host Extensions for IP Multicasting, Aug. 1989 https://tools.ietf.org/html/rfc1112.
M. Lottor, TCP Port Service Multiplexer (TCPMUX), Nov. 1988 https://tools.ietf.org/html/rfc1078.

* cited by examiner

TEMPORAL NETWORK SERVICE REQUEST COMBINATION TO IMPROVE THROUGHPUT

BACKGROUND OF THE INVENTION

In the field of electronic communication systems, requests for network services can often be duplicative or redundant, imposing network service costs for responding to the duplicative requests. For example, artificially intelligent computer systems (such as the IBM Watson™ cognitive question answering (QA) system or and other natural language question answering systems) are capable of processing questions posed in natural language to determine answers and associated confidence scores based on knowledge acquired by the QA system. In operation, users submit one or more questions through a front-end application user interface (UI) or application programming interface (API) to the QA system where the questions are processed to generate answers that are returned to the user(s). When a large number of users are simultaneously submitting questions, such as during distress situations, the submitted questions are typically treated independently from one another by the QA system which generates separate procedural responses from the ingested corpus. As a result, traditional QA systems will sequentially process submitted questions in chronological order without regard to any contextual understanding of other, potentially relevant questions and/or answers. Multicast networking allows a single service to respond to multiple machines at once by relying on the networking infrastructure to distribute the responses to the appropriate clients, but such reliance on the networking infrastructure makes this solution difficult to configure and maintain in all but the most controlled environments. TCP multiplexing can provide similar efficiencies in responding to requests, but only for a single client connecting to multiple services on an individual server, and even then only with specialized client and server software to perform the multiplexing. As a result, the existing solutions for efficiently processing questions and answers are extremely difficult at a practical level.

SUMMARY

Broadly speaking, selected embodiments of the present disclosure provide a system, method, and apparatus for processing of inquiries to an information handling system capable of answering questions by using the cognitive power of the information handling system to efficiently provide a requested network service to multiple users by temporally combining a plurality of network service requests based on configurable temporal grouping parameters relating to message type, client service, topic, network traffic, and the like to capture equivalent network service requests from users in the same or similar temporal vicinity. In selected embodiments, the information handling system may be embodied as a question answering (QA) system which receives and answers one or more questions from one or more users. To answer a question, the QA system has access to structured, semi-structured, and/or unstructured content contained or stored in one or more large knowledge databases (a.k.a., "corpus"), and may perform NLP analysis and/or semantic analysis of the question to derive an answer. In the process of answering a question, the QA system processes inquiries in real time to identify equivalent questions received within a time delay that may be configured by extracting parameters, such as message type, client service, topic, and/or network traffic. Rather than deploying QA system resources to separately answer each question, the equivalent questions identified within a temporal grouping defined by the configurable time delay may be processed with a single deployment of QA system resources. As a result, a first received request for a specified content stream will have its response delayed by the configurable time delay so that other requests for the same specified content stream can be processed with the same deployment of QA system resources used to generate the response to the first request. As will be appreciated, grouping requests at a higher level allows for more robust rules governing which requests can safely be grouped. For example, requests for the same content stream which are several seconds apart may warrant the first client waiting longer for other requestors to catch up. However, requests for personalized responses or containing sensitive information should never be combined.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
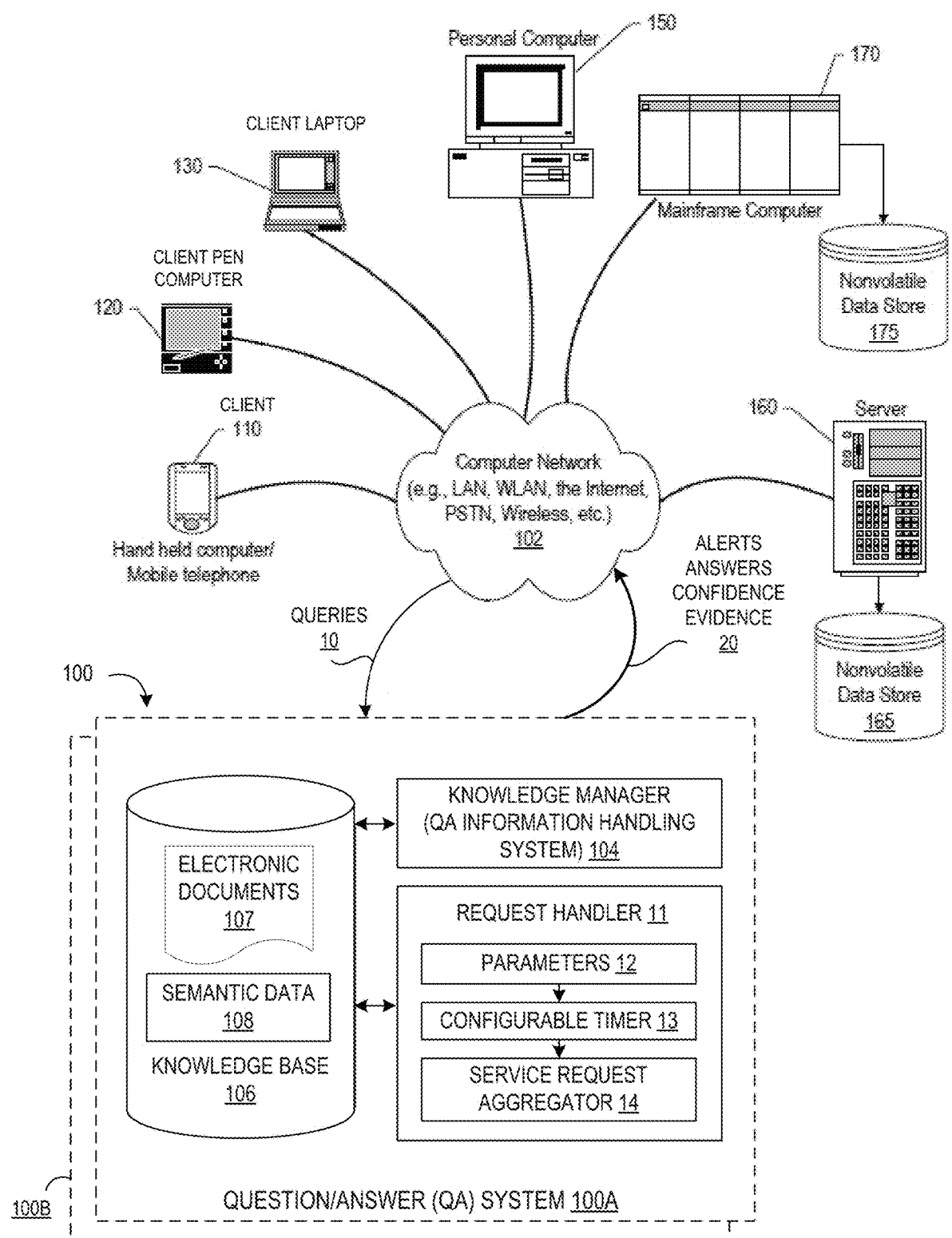
FIG. 1 depicts a network environment that includes a knowledge manager and request handler for aggregating service requests using a configurable timer.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected to a computer network 102. The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, subsystems, and/or devices other than those that are depicted herein.

In the QA system 100, the knowledge manager 104 may be configured to receive inputs from various sources. For example, knowledge manager 104 may receive input from the network 102, one or more knowledge bases or corpora of electronic documents 106 or other data, semantic data 108, content users, and other possible sources of input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 102 may include access points for clients or content users. Some of the computing devices may include devices for a database storing the corpus of data as the body of information used by the knowledge manager 104 to generate answers to cases. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 104. The document 107 may include any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager 104. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, New York, which is augmented with the mechanisms of the illustrative embodiments described hereafter. The IBM Watson™ knowledge manager system may receive an input question which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 100 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As seen from the foregoing, the QA system 100 deploys significant processing resources to provide answers to questions, but in cases where there are a large number of requests all requiring very similar responses, the individual processing of each request can consume significant processing power and resources. For example, a real world problem or emergency may trigger multiple requests from end users, all requiring very similar responses, such as a standard press release or response. In another example, there may be a media or entertainment programming event that is available online where multiple users request viewing access to the event. To efficiently process multiple requests that are directed to a common or shared response, the QA system 100 includes a request handler 11 which processes questions 10 in real time to identify equivalent requests from multiple clients that are temporally grouped together, and then aggregate the requested service or response from the equivalent requests at a service request aggregator 14. When identifying temporally grouped equivalent requests, the request handler 11 uses a configurable timer 13 which accesses one or more configurable parameters 12 to control the time delay based on, for example, message type, client service, topic, and network traffic. The service request aggregation process 14 may start the configurable timer 13 upon receiving a first user's request for a network service and then prepare a response to the first request. However, instead of sending the response directly to the first user, the service request aggregation process 14 identifies other user's requests that are equivalent to the first user's request and that are received before the configurable timer expires, and then sends the response to users who submitted the temporally grouped equivalent requests upon detecting that the timer exceeds a configurable elapsed time delay.

Types of information handling systems that can utilize the request handler 11 are not limited to QA systems 100, and can range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
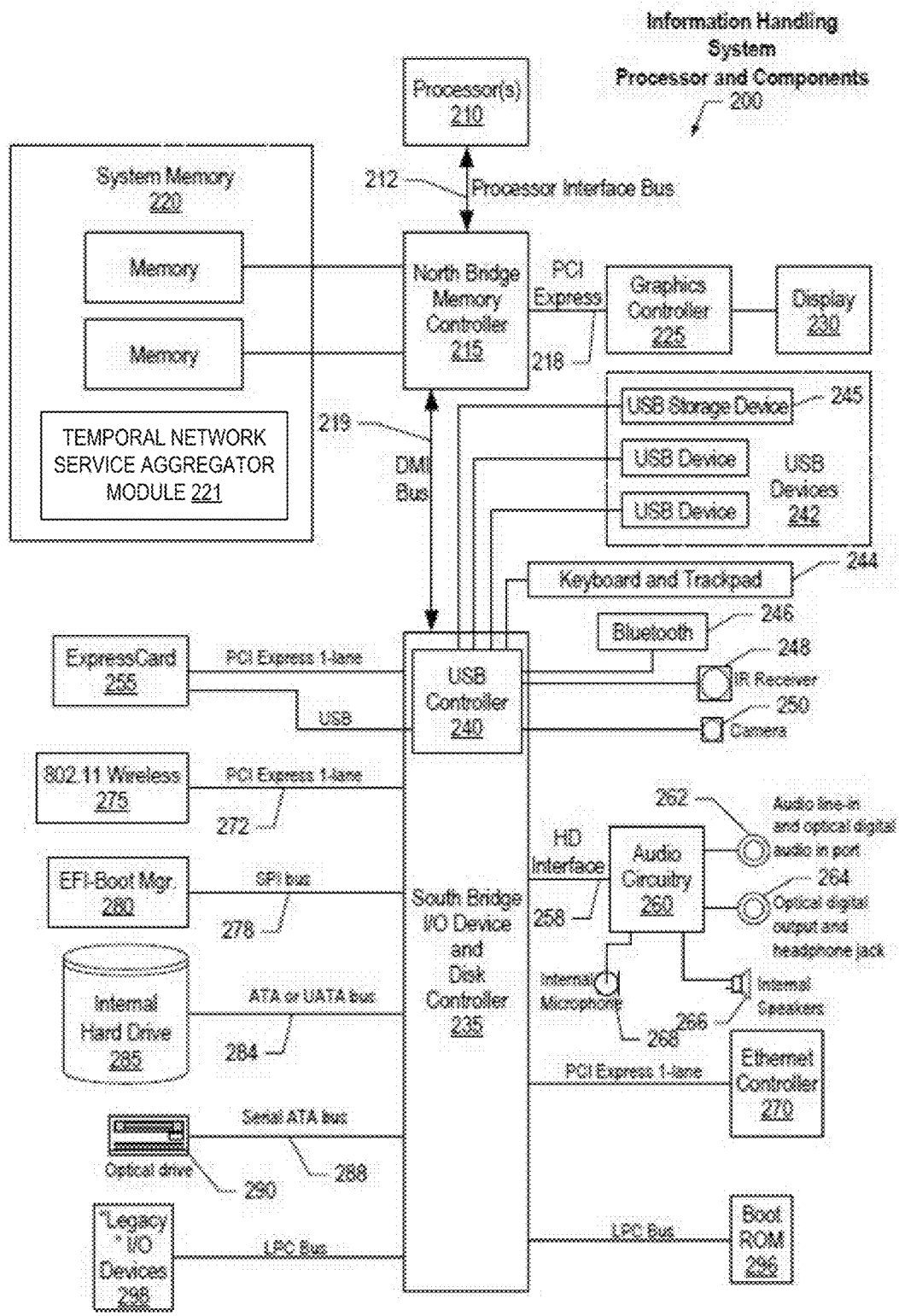
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a temporal network service aggregator module which may be invoked to process equivalent client requests together that are received within a configurable timer period that may be controlled based on parameters such as message type, client service, topic, and network traffic, thereby generating a single response for multiple clients in order to reduce the processing load at servers. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge, Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
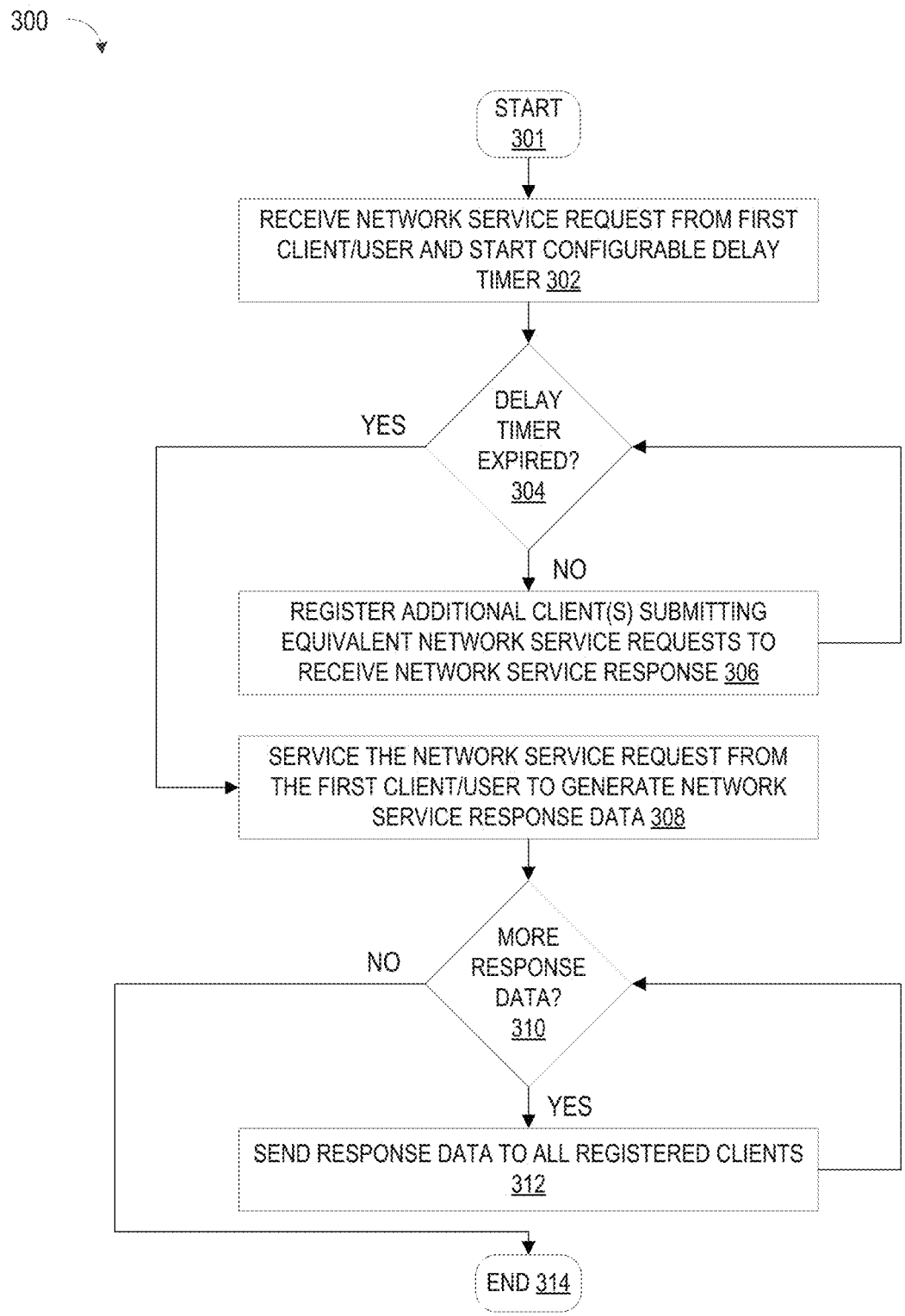
FIG. 3 illustrates a simplified flow chart showing the logic for temporally, combining a plurality of network service requests to use a single service response.

To provide additional details for an improved understanding of selected embodiments of the present disclosure, reference is now made to FIG. 3 which depicts a simplified flow chart 300 showing the logic for temporally combining a plurality of network service requests to use a single service response. The processing shown in FIG. 3 may be performed by any server-based system for handling client requests, such as an IBM IBM Watson™ QA system or other natural language question answering system shown in FIG. 1, which generates answers in response to submitted questions by ingesting structured, semi-structured, and/or unstructured content contained in a plurality of knowledge databases. FIG. 3 processing commences at 301 whereupon, at step 302, the process receives a network service request or question from a first end user or client, and starts a configurable delay timer. As disclosed herein, the configurable delay timer may have an adjustable time delay based on one or more parameters associated with the first user's network service request, such as message type, client service, topic, network traffic, and the like. As described herein, a Natural Language Processing (NLP) routine may be used to perform parameter extraction processing on the first user's network service request and/or on any computed answer, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. As a result of the processing step 302, the extracted parameter values are used to control the duration of the configurable timer. The processing at step 302 may be performed at the QA system 100 by the request handler 11 or other NLP question answering system.

At step 304, the process determines if the delay timer has expired. The processing at step 304 may be performed at the QA system 100 using the configurable timer 13 by comparing a current time value against a stored start time value to determine if the configurable delay timer value has expired.

If the delay timer has not expired (negative outcome from detection step 304), the process monitors incoming inquiries to receive and register one or more additional end user(s) or client(s) that submit equivalent network service requests corresponding to the network service response for the first network service request (step 306). As described herein, an NLP routine may be used to process the one or more additional network service requests or questions to identify network service requests that are equivalent to the first user's network service request. The processing at step 306 may be performed at the QA system 100 by the knowledge handler 104 and/or request handler 11 or other NLP question answering system. As a result of the processing step 306, equivalent requests received from other users or clients before expiration of the configurable timer are registered, effectively creating a short-term or temporary topic to which all clients requesting a given resource will be subscribed.

If the delay timer has expired (affirmative outcome from detection step 304), the network service request from the first user is processed or serviced to generate network service response data. As described herein, the service processing at step 308 may use an NIT routine to process the received network service request and/or generate a computed response or service for delivery to the registered clients who submitted equivalent network service requests. Though the service processing at step 308 is shown as being delayed until expiration of the delay timer, it will be appreciated that the service processing may begin before expiration of the delay timer, provided that delivery of the resulting network service response data is delayed until expiration of the delay tinier. In either case, the service processing at step 308 may be performed at the QA system 100 using the service request aggregator 14 or other NLP question answering system to generate an answer that may include associated evidence and confidence measures, though any desired information processing system for receiving and processing questions and answers may be used.

At step 310, the process determines if delivery of the network service response data is complete for the registered client(s)/user(s) who submitted equivalent network service requests during the configurable delay timer period. The processing at step 310 may be performed at the QA system 100 using the request handler 11 to determine if the registered or subscribing clients that made equivalent network service requests have all received the prepared network service response data. If there is more response data to be delivered, (affirmative outcome from detection step 310), the generated network service response data is sent to the registered end user(s) or client(s) that submitted equivalent network service requests (step 312). The processing at step 312 may be performed at the QA system 100 using the service request aggregator 14 until all response data is delivered (negative outcome to detection step 310), at which time the process ends (at step 314). With this arrangement for delivering network service response data, the delivery may be transmitted in batches to the registered end user(s) or client(s) using standard point-to-point communications for sending the response to the subscribed clients. As a result, there are efficiencies gained in responding to equivalent network service requests, no from reducing the number of packets put on the wire, but rather in reducing the amount of work required to construct the network service response data as only one response needs to be constructed for each group of registered clients.

By now, it will be appreciated that there is disclosed herein a system, method, apparatus, and computer program product for generating a delayed network service response for a plurality of network service requests presented to an information handling system having a processor and a memory. As disclosed, the system, method, apparatus, and computer program product receive a first network service request from a first user and identifying, a first plurality of parameters associated with the first network service request which are used to control the duration of a configurable delay timer. In selected embodiments, the parameters are identified by performing a natural language processing (NLP) analysis of the first network service request to extract message type, client service, topic, and network traffic associated with the first network service request. Upon receipt of the first network service request, the configurable delay timer is started, such as by storing a start time in response to receiving the first network service request which is compared to a current time to determine when the configurable delay timer expires. While the configurable delay timer runs, one or more equivalent network service requests received from one or more users are identified until the configurable delay timer expires, where the one or more equivalent network service requests request the same network service as the first network service request. In selected embodiments, the equivalent network service requests may be identified by performing NLP analysis of the first network service request and one or more equivalent network service requests based on extracted message type, client service, topic, and network traffic associated with the first network service request. In addition, the system, method, and apparatus may register one or more users associated with the one or more equivalent network service requests that are received before expiration of the configurable delay timer. Upon expiration of the configurable delay timer, a network service response is generated in response to the first network service request without generating a network service response to the one or more equivalent network service requests, such as by identifying digital content in response to the first network service request and/or performing NIT analysis of the first network service request. The resulting network service response is sent to the first user and to the one or more users after expiration of the configurable delay timer.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of generating a single network service response for a plurality of network service requests presented to the information handling system, the method comprising:

receiving, by the information handling system, a first network service request from a first user;

identifying, by the information handling system, a first plurality of parameters included in the first network service request, wherein the first plurality of parameters comprising a message type parameter, client service parameter, topic parameter, and network traffic parameter for the first network service request;

starting, by the information handling system, a configurable delay timer upon receipt of the first network service request, where an adjustable duration of the configurable delay timer is controlled by the first plurality of parameters for the first network service request;

grouping, by the information handling system and based on the first plurality of parameters, the first network service request and one or more equivalent network service requests from one or more users that are received before expiration of the configurable delay timer, where the one or more equivalent network service requests request the same network service as the first network service request;

generating, upon expiration of the configurable delay timer, a single network service response by the information handling system in response to the first network service request and the one or more equivalent network service requests without generating a network service response to the one or more equivalent network service requests; and sending, by the information handling system, the single network service response to the first user and to the one or more users after expiration of the configurable delay timer.

2. The method of claim 1, wherein identifying the first plurality of parameters comprises performing, by the information handling system, a natural language processing (NLP) analysis of the first network service request, wherein the NLP analysis extracts message type, client service, topic, and network traffic associated with the first network service request.

3. The method of claim 1, wherein starting the configurable delay timer comprises storing a start time in response to receiving the first network service request which is compared to a current time to determine when the configurable delay timer expires.

4. The method of claim 1, wherein grouping the first network service request and the one or more equivalent network service requests comprises performing, by the information handling system, a natural language processing (NLP) analysis of a message type parameter, client service parameter, topic parameter, and network traffic parameter extracted from the first network service request and the one or more equivalent network service requests.

5. The method of claim 1, wherein generating the single network service response comprises performing, by the information handling system, a natural language processing (NLP) analysis of the first network service request.

6. The method of claim 1, wherein generating the single network service response comprises identifying, by the information handling system, digital content in response to the first network service request.

7. The method of claim 1, further comprising registering, by the information handling system, the one or more users associated with the one or more equivalent network service requests that are received before expiration of the configurable delay timer.

8. An information handling system comprising:

one or more processors;

a memory coupled to at least one of the one or more processors;

a set of instructions stored in the memory and executed by at least one of the one or more processors to generate a single network service response for a plurality of network service requests presented to the information handling system, wherein the set of instructions are executable to perform actions of:

receiving, by the information handling system, a first network service request from a first user;

identifying, by the information handling system, a first plurality of parameters included in the first network service request, wherein the first plurality of parameters comprising a message type parameter, client service parameter, topic parameter, and network traffic parameter for the first network service request;

starting, by the information handling system, a configurable delay timer upon receipt of the first network service request, where an adjustable duration of the configurable delay timer is controlled by the first plurality of parameters for the first network service request;

grouping, by the information handling system and based on the first plurality of parameters, the first network service request and one or more equivalent network service requests from one or more users that are received before expiration of the configurable delay timer, where the one or more equivalent network service requests request the same network service as the first network service request;

generating, upon expiration of the configurable delay timer, a single network service response by the information handling system in response to the first network service request and the one or more equivalent network service requests without generating a network service response to the one or more equivalent network service requests; and sending, by the information handling system, the single network service response to the first user and to the one or more users after expiration of the configurable delay timer as single response that is subsequently broken/split up for distribution to the first user and the one or more users.

9. The information handling system of claim 8, wherein the set of instructions are executable to identify the first plurality of parameters by performing, by the information handling system, a natural language processing (NLP) analysis of the first network service request, wherein the NLP analysis extracts message type, client service, topic, and network traffic associated with the first network service request.

10. The information handling system of claim 8, wherein the set of instructions are executable to start the configurable delay timer by storing a start time in response to receiving the first network service request which is compared to a current time to determine when the configurable delay timer expires.

11. The information handling system of claim 8, wherein the set of instructions are executable to group the first network service request and the one or more equivalent network service requests by performing, by the information handling system, a natural language processing (NLP) analysis of a message type parameter, client service parameter, topic parameter, and network traffic parameter for the first network service request parameter extracted from the first network service request and the one or more equivalent network service requests.

12. The information handling system of claim 8, wherein the set of instructions are executable to generate the network service response by performing, by the information handling system, a natural language processing (NLP) analysis of the first network service request.

13. The information handling system of claim 8, wherein the set of instructions are executable to generate the single network service response by identifying, by the information handling system, digital content in response to the first network service request.

14. The information handling system of claim 8, wherein the set of instructions are executable to register, by the information handling system, the one or more users associated with the one or more equivalent network service requests that are received before expiration of the configurable delay timer.

15. A computer program product stored in a computer readable storage medium, comprising computer instructions that, when executed by an information handling system, causes the information handling system to generate a single network service response for a plurality of network service requests presented to the information handling system by performing actions comprising:

receiving, by the information handling system, a first network service request from a first user;

identifying, by the information handling system, a first plurality of parameters included in the first network service request, wherein the first plurality of parameters comprising a message type parameter, client service parameter, topic parameter, and network traffic parameter for the first network service request;

starting, by the information handling system, a configurable delay timer upon receipt of the first network service request, where an adjustable duration of the configurable delay timer is controlled by the first plurality of parameters for the first network service request;

grouping, by the information handling system and based on the first plurality of parameters, the first network service request and one or more equivalent network service requests from one or more users that are received before expiration of the configurable delay timer, where the one or more equivalent network service requests request the same network service as the first network service request;

generating, upon expiration of the configurable delay timer, a single network service response by the information handling system in response to the first network service request and the one or more equivalent network service requests without generating a network service response to the one or more equivalent network service requests; and sending, by the information handling system, the single network service response to the first user and to the one or more users after expiration of the configurable delay timer.

16. The computer program product of claim 15, wherein identifying the first plurality of parameters comprises performing, by the information handling system, a natural language processing (NLP) analysis of the first network service request, wherein the NLP analysis extracts message type, client service, topic, and network traffic associated with the first network service request.

17. The computer program product of claim 15, wherein starting the configurable delay timer comprises storing a start time in response to receiving the first network service request which is compared to a current time to determine when the configurable delay timer expires.

18. The computer program product of claim 15, wherein grouping the first network service request and the one or more equivalent network service requests comprises performing, by the information handling system, a natural language processing (NLP) analysis of a message type parameter, client service parameter, topic parameter, and network traffic parameter extracted from the first network service request and the one or more equivalent network service requests.

19. The computer program product of claim 15, wherein generating the single network service response comprises performing, by the information handling system, a natural language processing (NLP) analysis of the first network service request.

20. The computer program product of claim 15, wherein generating the single network service response comprises identifying, by the information handling system, digital content in response to the first network service request.

21. The computer program product of claim 15, further comprising computer instructions that, when executed by an information handling system, cause the information handling system to register, by the system, the one or more users associated with the one or more equivalent network service requests that are received before expiration of the configurable delay timer.

* * * * *